Patented Sept. 15, 1942

2,295,655

UNITED STATES PATENT OFFICE 2,295,655

QUATERNARY AMMONIUM COMPOUNDS AND METHOD OF PRODUCING THE SAME

Winfrid Hentrich, Dusseldorf-Reisholz, Wilhelm Kaiser, Dessau in Anhalt, and Werner Reuss, deceased, late of Dusseldorf-Benrath, Germany, by Elfriede Reuss, widow and sole heir, Dusseldorf - Benrath, Germany; Carl-Heinz Winkler, administrator of Werner Reuss, deceased, assignors, by mesne assignments, to "Patchem A.-G. Zur Beteiligung an Patenten und Sonstigen Erfindungsrechten auf Chemische Verfahren," Zurich, Switzerland, a corporation of Switzerland No Drawing. Application April 8, 1938, Serial No. 200,839½. In Germany April 13, 1937

5 Claims. (Cl. 260—561)

The present invention has for an object to provide an improved quaternary ammonium compound and an improved method of producing the same.

The producing of amino-carboxylic acid amides or -esters including those which in the amido- or in the ester group contain at least one lipophile radical, or residue, is not new. It can be performed in letting ammonia or amines react upon halogenated carboxylic acid amides or -esters, but the converting of amino-carboxylic acid halogenides with alcohols or amines respectively is likewise practicable.

Now it has been found that valuable nitrogenous compounds are obtainable in converting such amino-carboxylic acid amides or -esters containing on the amino-nitrogen or in the ester group at least one lipophile radical, into quaternary ammonium compounds.

The amino-carboxylic acid amides or -esters which may be applied as initial stuffs for the present method, are of the general formula $R.R_1.N.R_2.CO.X.R_3$. In this formula R and $R_1$ mean hydrogen or any hydrocarbon radicals which also conjointly may form with the nitrogen-atom a hetero-cyclic ring; $R_2$ means a bi-valent hydrocarbon radical; X represents $NR_4$ ($R_4$=hydrogen or any hydrocarbon radical) or O, whilst $R_3$ is to be a hydrocarbon radical with no less than 6 carbon atoms.

R and $R_1$ may e. g. be formed of methyl-, ethyl-, propyl-, allyl-groups and the like, or they may also belong to a piperidine- or pyrrolidine ring. The several compounds are similar and, to a substantial extent, equivalents in that they all have the important trivalent nitrogen atom. Further they may be formed of a benzyl-, furfuryl-radical and the like. $R_2$ may be represented by e. g. an ethylene-, phenyl ethylene-, propylene- or butylene radical and the like. $R_3$ may be formed of a higher molecular hydrocarbon radical containing no less than 6 C atoms of the aliphatic, cyclo-aliphatic, aromatic and fatty aromatic series such as hexyl-, octyl-, decyl-, dodecyl-, cetyl-, octadecyl-, octadecenyl-, hydroxy-octadecenyl radical and the like. Moreover $R_3$ may be represented by a cyclohexyl radical, an alkylated cyclohexyl radical such as the p-dodecyl-o-methyl-cyclohexyl radical, a naphthenyl radical, an abiethyl radical, a phenyl radical, an alkylated phenyl radical, a benzyl radical and the like. Those radicals may also contain hetero-atoms and hetero-atom groups such as oxygen, sulfur, nitrogen and the like. $R_4$ may be e. g. a radical of methyl, ethyl, propyl, allyl, butyl, benzyl, furfuryl, phenyl and the like.

Among the amino-carboxylic acid amides or -esters applicable as initial stuffs for the present invention there are to be considered e. g. dimethyl-amino-acetic acid-octyl-amide, piperidino-acetic acid-octyl-amide, dimethyl-amino-butyric acid-dodecyl-amide, dimethyl-amino-acetic acid-undecylene-amide, dimethyl-amino-acetic acid-dodecyl-amide, di-ethyl-amino-acetic acid-cetyl-amide, β-dimethyl-amino-α-diethyl-propionic acid-cetyl-ester, piperidino-acetic acid-dodecyl-benzyl-amide, dimethyl-amino-acetic acid-(p-dodecoxy)-phenyl-amide, and further the amino-acetic acid-dodecyl-amide, methyl-amino-acetic acid-cetyl ester, amino-propionic acid-dodecyl-benzyl amide and the like.

The converting of those compounds into quaternary ammonium compounds is accomplished by direct reaction of mineral acid esters of aliphatic, fatty aromatic, cyclo-aliphatic or heterocyclic alcohols such as alkyl-halogenides, e. g. methyl-chloride, methyl-iodide, allyl-bromide, octyl-bromide, hexadecyl-bromide, further the dimethyl sulfate, diethyl-sulfate, octyl-mono-sulfuric acid ester, benzyl chloride, furfuryl chloride, tetra-hydro-furfuryl chloride and the like.

The conversion by reaction between the amino-carboxylic acid-amides or -esters, on the one hand, and the mineral acid esters, on the other hand, is performed while warming up and eventually in the presence of solvents or diluents.

*Example 1*

To 310 parts by weight of melted dodecyl-amide of the piperidino-acetic acid 127 parts by weight of benzyl chloride are added while stirring and at a temperature of 50° C. After warming up from 50 to 60° C. until the reaction is at its end, one allows cooling, whereby the melt solidifies to a crystalline mass. The thus obtained piperidino-acetic acid-dodecyl-amide-chlorobenzylate dissolves clear in water and the aqueous solution is much lathering. By re-crystallizing from xylol the product can be obtained quite colourless (melting point 114° C.). A similar compound is obtained in warming 7 parts by weight of piperidino-acetic acid-dodecyl-benzyl amide up to 50–60° C. for about 2 hours together with 2,2 parts by weight of dimethyl-sulfate.

*Example 2*

19 parts by weight of piperidino-acetic acid-dodecyl ester are warmed up to 80–90° C. for 8 hours together with 13 parts by weight of benzyl-chloride. Then the mixture is dissolved in water and warmed, whereby the excess benzyl-chloride, which is floating in the form of oil on the surface of the solution, is to be separated off. After evaporating the solution liberated from the benzyl-chloride, we obtain the piperidino-acetic acid-dodecyl-ester-chlorobenzylate in the form of a powder. One may also substitute a mixture of fatty alcohol esters for the dodecyl-ester.

*Example 3*

270 parts by weight of dimethyl-amino-acetic acid-dodecyl-amide are warmed up to 50–60° C. for several hours together with 127 parts of benzyl-chloride. The thus obtained crystalline mass may eventually be ground with a solvent (decahydronaphthalin) for purification. By sucking off the solvent we obtain the dimethyl-amino-acetic acid-dodecyl-amide-chlorobenzylate being a well crystallized substance (melting point 147 to 148° C.) soluble clear in water. This compound may be described as N-dimethyl N-benzyl N-chlor N'-methyl-dodecyl-glycinamide.

In a similar manner we obtain the dimethyl-amino-acetic acid (furfuryl-dodecyl-amide)-chloromethylate, piperidino-acetic acid (4-sec.-octyl-2-methyl-cyclohexyl-methyl-amide)-chlorobenzylate, (benzyl-methyl-amino)-acetic acid-(methyl-dodecyl-amide)-chloromethylate, dimethyl-amino-acetic acid (benzyl-dodecyl-amide)-chloromethylate and the like.

Those quaternary ammonium compounds distinguish themselves, without counting their water-solubility and indifference to hardness-provokers of the water and to hydrolysing influences, not only by an excellent soap-like action, but also by a most remarkable disinfecting action upon e. g. the staphylo-coccus and the typhus bacillus.

Those compounds offer moreover the advantage of being obtainable in a generally very good crystalline form allowing an easy dosing and mixing with substratums. Besides this we can without difficulty obtain crystallizable products of such a purity as required e. g. for pharmaceutical purposes.

The aforesaid compounds may be applied either alone or mixed with other disinfecting media and eventually with an addition of diluents or stretching agents for the disinfection of commodities, medical instruments, textiles, linen, walls, tiles, floors, implements, apparatus used in the alimentary and appetizing products industry, as well as for the disinfecting of animals and parts of the human body. Moreover they are apt for the preserving of perishable animal and vegetable goods such as pastes and sizes, furs, hides, skins and the like.

The quaternary amino-carboxylic acid-amides of the present invention are e. g. of the general formula Am.R'.CO.N.R''R'''. In this formula R'.CO means the radical of an aliphatic acid such as acetic acid, propionic acid and butyric acid, R''=hydrogen or any organic radical. R''' means a lipophile radical such as octyl-, nonyl-, decyl-, dodecyl-, tridecyl-, tetradecyl-, hexadecyl radical or the like. "Am" represents any quaternary ammonium group containing anion. The ammonium group may contain equal or mixed aliphatic, aromatic, aliphatic-aromatic or heterocyclic radicals. Of a particularly good disinfecting power are those compounds, which in the molecule e. g. in the quaternary ammonium group or on the amino-nitrogen contain an unsaturated hydrocarbon radical such as the benzyl residue, the allyl-residue and the like.

The compounds of the present invention may therefore be applied also with alkaline or acid stuffs. Moreover they are of a good wetting-power by which the penetration into textiles and the spreading-out on soiled and stained surfaces is considerably enhanced. The efficiency and the mode of application of the compounds in question as disinfecting and preserving agents is shown by the following examples:

(a) A 0.01% - solution of (benzyl - methyl - amino)-acetic acid-dodecylamide-chloromethylate of the formula

$(CH_3)_2.(C_7H_7)NCl.CH_2.CO.NH.C_{12}H_{25}$ kills completely, at 20° C. a deposit of mycoderma within 15 minutes.

A 0.002%-solution of the same compound destroys completely at 20° C. a deposit of bacteria coli within 45 minutes.

A 0.0057%-solution of the same compound destroys completely, at 20° C., a deposit of staphylococcus aureus within 5 minutes.

Of a similar efficiency are also the compounds where the dodecyl-radical is replaced by an octyl-, decyl- or tetra-decyl radical, as well as the mixtures of those bodies.

(b) A 0.01%-solution of dimethyl-amino-acetic acid-dodecylamide-chloromethylate of the formula $(CH_3)_3.NCl.CH_2CO.NH.C_{12}H_{25}$ kills, at 20° C., a deposit of bacteria coli completely within 15 minutes. This compound may be described as N-trimethyl N-chlor N'-dodecyl-glycinamide.

A 0.014%-solution of the same compound destroys completely, at 20° C., a deposit of pyocyaneus within 5 minutes.

(c) A 0.005%-solution of dimethyl-amino-acetic acid (benzyl-dodecyl-amide)-chloromethylate of the formula

$(CH_3)_3.NCl.CH_2.CO.N(C_7H_7).(C_{12}H_{25})$ kills completely a deposit of bacteria coli within 15 minutes. This compound may be described as N-trimethyl N-chlor N'-benzyl N'-dodecyl-glycinamide.

The same efficiency shows a 0.005%-solution of piperidino-acetic acid-dodecylamide-chloromethylate of the formula

$(CH_3).(C_5H_{10}).NCl.CH_2CO.NH.C_{12}H_{25}$ (d) The 1%-solution of a mixture of 70 parts by weight of crystallized sodium-meta-silicate, 29 parts of crystallized tri-basic sodium-phosphate and 1 part of the dimethyl-amino-acetic acid-dodecyl-amide-chloromethylate mentioned in example (b), kills completely, at 50° C., a deposit of mycoderma within 5 minutes. This solution may be heated for a rather long time and kept for several days without reducing its disinfecting power.

(e) A 0.005%-solution of (benzyl-methyl-amino)-acetic acid-(methyl-dodecyl-amide)-chloromethylate of the formula

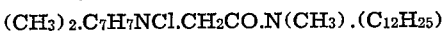

$(CH_3)_2.C_7H_7NCl.CH_2CO.N(CH_3).(C_{12}H_{25})$ kills completely, at 20° C., a deposit of bacteria coli within 30 minutes. This compound may be described as N-dimethyl N-benzyl N-chlor-dodecyl-glycinamide.

(f) A 0.01%-solution of dimethyl-amino-phenyl-acetic acid - dodecyl-amide - chloromethylate of the formula (CH₃)₃.NCl.CH.(C₆H₅)CO.NH.C₁₂H₂₅ destroys entirely, at 20° C., a deposit of bacteria coli within 15 minutes.

(g) A 0.002%-solution of benzyl-cyclohexyl-amino-acetic acid-dodecylamide-chloromethylate of the formula (CH₃).(C₇H₇).(C₆H₁₁).NCl.CH₂.CO.NH.C₁₂H₂₅ kills completely, at 20° C., a deposit of bacteria coli within 45 minutes. This compound may be described as N-methyl N-benzyl N-cyclohexyl N-chlor N'-dodecyl-glycinamide.

(h) 40 parts by weight of caustic soda, 30 of sodium-meta-silicate of the formula Na₂SiO₃.5H₂O 19 parts by weight of calcined tri-sodium-phosphate, 10 of soda ash and 1 part of piperidino-acetic acid-dodecylamide-chlorobenzylate (or N-pentamethyl N-benzyl N-chlor-dodecyl-glycinamide) of the formula (C₅H₁₀).(C₇H₇).NCl.CH₂.CO.NH.C₁₂H₂₅ are well mixed together. An aqueous solution of this mixture at the ratio of 0.25% kills entirely, at 50° C., a deposit of bacteria coli within 6 minutes.

The aqueous solutions of this mixture may be applied as excellent detergents of a simultaneous disinfecting action.

We claim:

1. A quaternary ammonium compound of the general formula R.R₁.R₅.N.Y.R₂.CO.NH.R₃ in which R₁ and R₂ each represent a member of the group consisting of hydrogen and the hydrocarbon radicals containing 1 to 3 carbon atoms, R₅ represents a hydrocarbon radical, Y represents a mineral acid radical, R₂ represents an alkylene group containing 2 to 4 carbon atoms and R₃ represents a hydrocarbon radical containing 6 to 18 carbon atoms.

2. The quaternary ammonium compound N-dimethyl N-benzyl N-chlor N'-dodecyl-glycinamide.

3. The method of manufacturing nitrogenous compounds characterized by reacting compounds of the general formula R.R₁.N.R₂.CO.NH.R₃, in which R and R₁ each represent a member of the group consisting of hydrogen and the hydrocarbon radicals containing 1 to 3 carbon atoms, R₂ represents a hydrocarbon radical, containing 2 to 4 carbon atoms, and R₃ represents an alkyl radical containing 6 to 18 carbon atoms, with mineral acid esters of alcohols to form quaternary ammonium compounds by addition of the component radicals of the mineral acid esters on the first N atom.

4. The method of manufacturing nitrogenous compounds characterized by reacting compounds of the general formula R.R₁.N.R₂.CO.NH.R₃, in which R and R₁ each represent a member of the group consisting of hydrogen and the hydrocarbon radicals containing 1 to 3 carbon atoms, R₂ represents a hydrocarbon radical, containing 2 to 4 carbon atoms, and R₃ represents an alkyl radical containing 6 to 18 carbon atoms, with mineral acid esters of the group consisting of methyl-chloride, methyl-iodide, allyl-bromide, octyl-bromide, hexadecyl-bromide, dimethyl-sulfate, diethyl-sulfate, and octyl-mono-sulfate, to form quaternary ammonium compounds by addition of the component radicals of the mineral acid esters on the first N atom.

5. The method of manufacturing nitrogenous compounds characterized by reacting compounds of the group consisting of dimethyl-amino-acetic acid-octyl-amide, tetramethyl-acetic acid-octyl-amide, dimethyl-amino-butyric acid-dodecyl-amide, dimethyl-amino-acetic acid-undecylene-amide, dimethyl-amino-acetic acid-dodecyl-amide, di-ethyl-amino-acetic acid-cetyl amide, and amino-acetic acid-dodecyl-amide, with mineral acid esters of the aliphatic alcohols to form quaternary ammonium compounds by addition of the component radicals of the mineral acid esters on the first N atom.

WINFRID HENTRICH.
WILHELM KAISER.
ELFRIEDE REUSS,
*Widow of Werner Reuss, Deceased.*